(12) United States Patent
Byl

(10) Patent No.: US 7,360,732 B1
(45) Date of Patent: Apr. 22, 2008

(54) FISHING APPARATUS

(76) Inventor: Sibby Byl, 44 Meredith Cresent, Hampton Park, VI (AU) 3976

( * ) Notice: Subject to any disclaimer, the term of this patent is extended or adjusted under 35 U.S.C. 154(b) by 0 days.

(21) Appl. No.: 11/742,981

(22) Filed: May 1, 2007

(51) Int. Cl.
*A01K 89/01* (2006.01)

(52) U.S. Cl. ............... 242/223; 242/303; 242/317; D40/140

(58) Field of Classification Search ........... 242/223, 242/370, 249, 283, 303, 317; D22/140
See application file for complete search history.

(56) References Cited

U.S. PATENT DOCUMENTS

| | | | |
|---|---|---|---|
| 58,378 A * | 10/1866 | Chamberlain | 242/395 |
| 1,455,343 A * | 5/1923 | Leber | 242/395 |
| 1,944,669 A * | 1/1934 | Purdy | 242/395 |
| 2,047,705 A * | 7/1936 | Porter | 242/396.9 |
| 2,434,479 A * | 1/1948 | Allen | 242/387 |
| 2,706,096 A | 4/1955 | Rufle | |
| 2,753,131 A * | 7/1956 | Erdman | 242/387 |
| 2,757,881 A * | 8/1956 | Halsey | 242/396.7 |
| 2,855,717 A * | 10/1958 | Heil | 43/18.1 R |
| 3,740,010 A * | 6/1973 | Curtis | 244/155 A |
| 3,952,965 A | 4/1976 | Falcon | |
| 4,014,477 A * | 3/1977 | Hyun | 242/395 |
| 4,522,349 A | 6/1985 | Clerk | |
| 4,688,740 A | 8/1987 | Weeks et al. | |
| 5,186,411 A * | 2/1993 | Fanning et al. | 242/405.3 |
| 5,238,201 A * | 8/1993 | Jonushaitis | 242/396.8 |
| 5,868,334 A * | 2/1999 | Cedillo | 242/405.3 |
| 5,927,635 A * | 7/1999 | Black et al. | 242/395 |
| 6,209,815 B1 * | 4/2001 | Collier | 242/303 |
| 6,224,011 B1 | 5/2001 | Gavaza, III | |
| 6,474,581 B2 * | 11/2002 | Norris | 242/296 |
| 6,585,182 B1 * | 7/2003 | Garcia | 242/322 |

* cited by examiner

*Primary Examiner*—Emmanuel M Marcelo
(74) *Attorney, Agent, or Firm*—Crossley Patent Law; Mark A. Crossley

(57) ABSTRACT

A fishing apparatus that allows an individual to catch fish, while at the same, not be encumbered with a traditional fishing rod and reel. The fishing apparatus includes a reel that has an indentation where a length of fishing line or monofilament is wound around. To one side of the reel is attached a centrally-mounted plastic grip, while an offset handle is attached to the other side of the reel. The fishing line, as it exits the reel, passes through a loop attached to a line guide which is mounted on the reel. A tensioner bolt, which is centrally mounted on the opposite side as that of the centrally-mounted grip, passes through the reel and provides tension against the fishing apparatus, thereby giving a more authentic feel to the fishing apparatus in comparison to a standard fishing rod and reel.

8 Claims, 4 Drawing Sheets

FISHING APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present invention concerns that of a new and improved fishing apparatus that allows an individual to catch fish, while at the same, not be encumbered with a traditional fishing rod and reel.

DESCRIPTION OF THE PRIOR ART

U.S. Pat. No. 2,706,096, issued to Rufle, discloses a reel which is particularly suited for use in fishing.

U.S. Pat. No. 3,952,965, issued to Falcon, discloses a reel comprised of a round cylindrical housing having one integral end wall closure providing a hand grip means, and a spool rotatably journaled within the cylindrical housing chamber.

U.S. Pat. No. 6,224,011, issued to Gavaza, III, discloses a fishing line spool holder for facilitating the transfer of fishing line from a supply spool to a fishing reel.

U.S. Pat. No. 4,688,740, issued to Weeks et al., discloses a hand reel for fishing line.

U.S. Pat. No. 4,522,349, issued to Clerk, discloses a fishing reel is provided with a housing having a central opening therein.

SUMMARY OF THE INVENTION

The present invention concerns that of a new and improved fishing apparatus that allows an individual to catch fish, while at the same, not be encumbered with a traditional fishing rod and reel. The fishing apparatus includes a reel that has an indentation where a length of fishing line or monofilament is wound around. To one side of the reel is attached a centrally-mounted plastic grip, while an offset handle is attached to the other side of the reel. The fishing line, as it exits the reel, passes through a loop attached to a line guide which is mounted on the reel. A tensioner bolt, which is centrally mounted on the opposite side as that of the centrally-mounted grip, passes through the reel and provides tension against the fishing apparatus, thereby giving a more authentic feel to the fishing apparatus in comparison to a standard fishing rod and reel.

There has thus been outlined, rather broadly, the more important features of a fishing apparatus that the detailed description thereof that follows may be better understood and in order that the present contribution to the art may be better appreciated. There are, of course, additional features of the fishing apparatus that will be described hereinafter and which will form the subject matter of the claims appended hereto.

In this respect, before explaining at least one embodiment of the fishing apparatus in detail, it is to be understood that the fishing apparatus is not limited in its application to the details of construction and to the arrangements of the components set forth in the following description or illustrated in the drawings. The fishing apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present fishing apparatus. It is important, therefore, that the claims be regarded as including such equivalent constructions insofar as they do not depart from the spirit and scope of the present invention.

It is therefore an object of the present invention to provide a fishing apparatus which has all of the advantages of the prior art and none of the disadvantages.

It is another object of the present invention to provide a fishing apparatus which may be easily and efficiently manufactured and marketed.

It is another object of the present invention to provide a fishing apparatus which is of durable and reliable construction.

It is yet another object of the present invention to provide a fishing apparatus which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
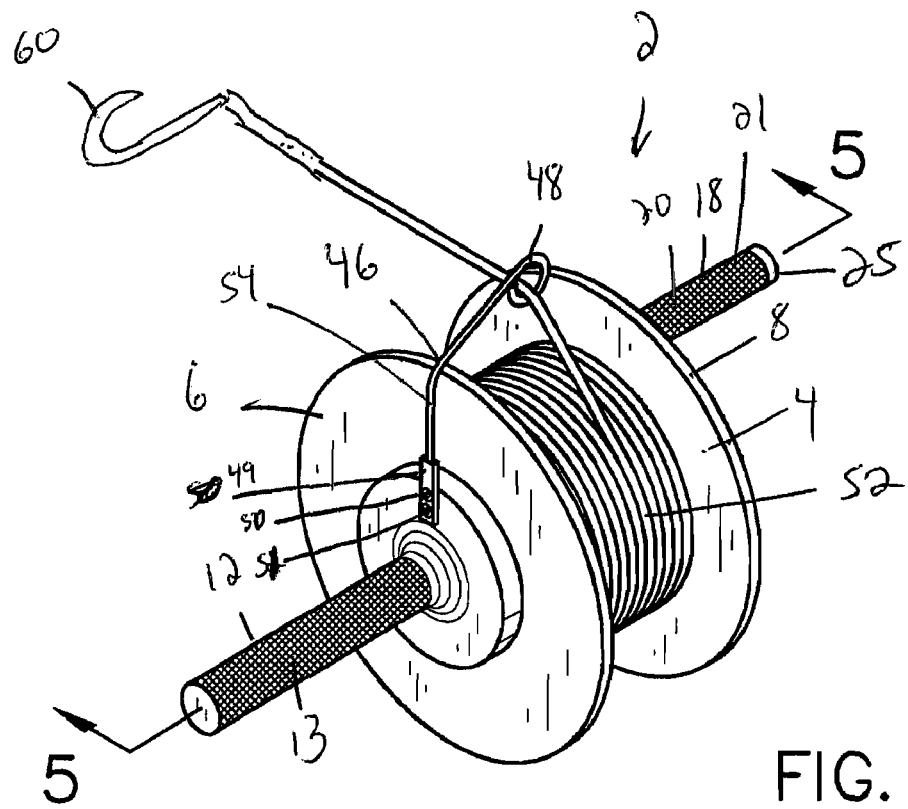
FIG. 1 shows a left perspective view of the fishing apparatus as it would appear fully assembled.
Figure 2:
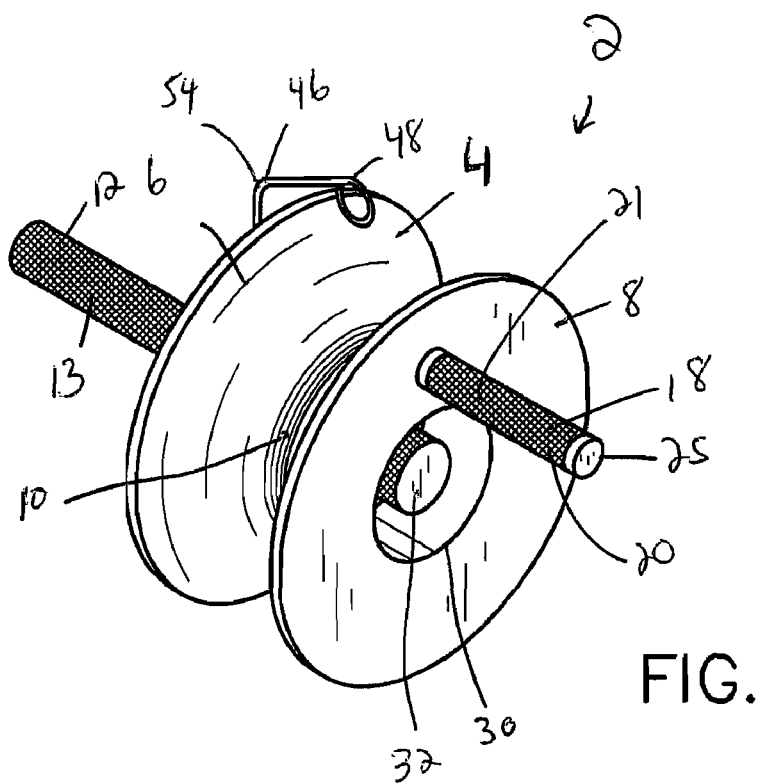
FIG. 2 shows a right perspective view of the fishing apparatus as it would appear fully assembled.
Figure 3:
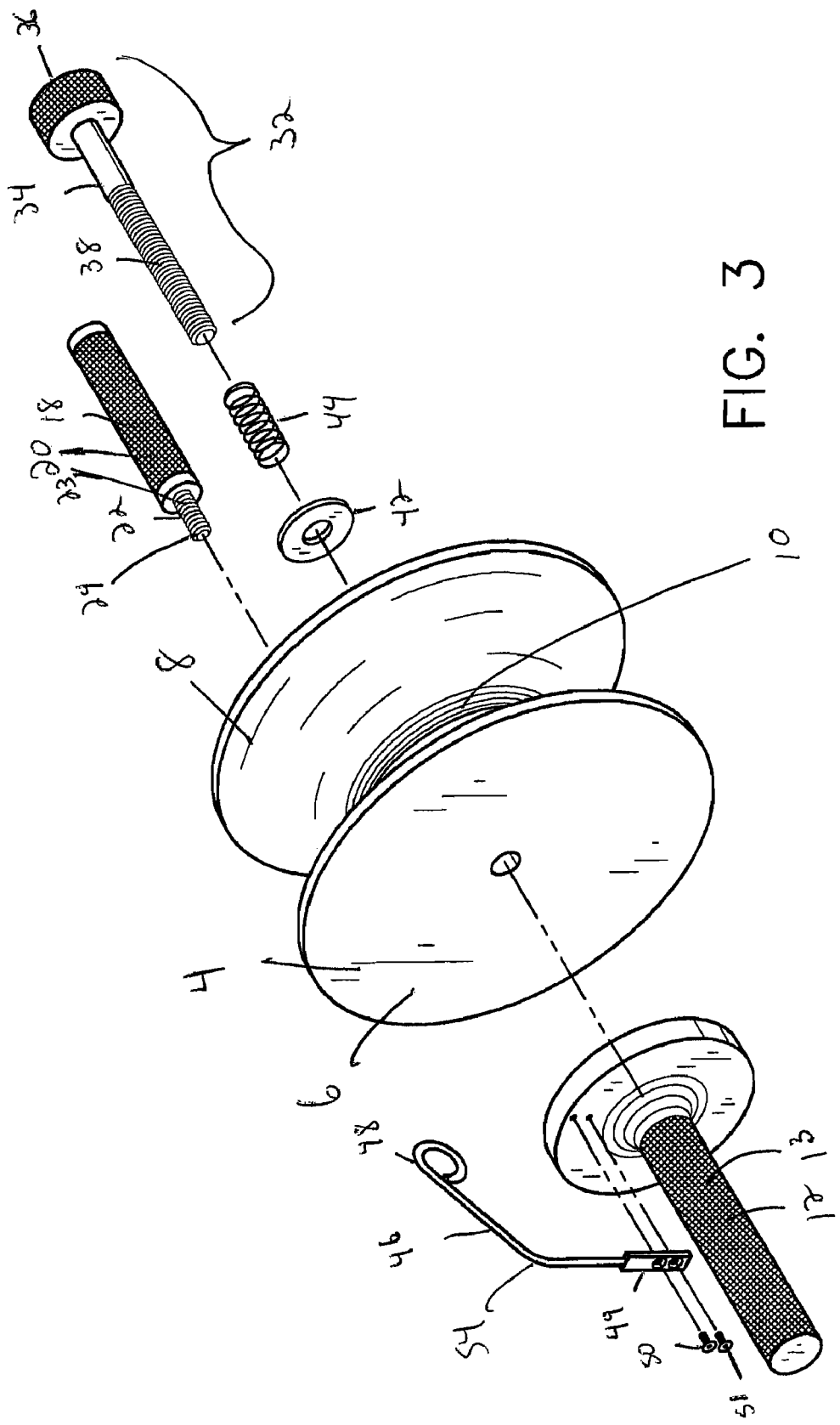
FIG. 3 shows a left perspective view of the fishing apparatus as it would in a disassembled manner, highlighting the various parts.
Figure 4:
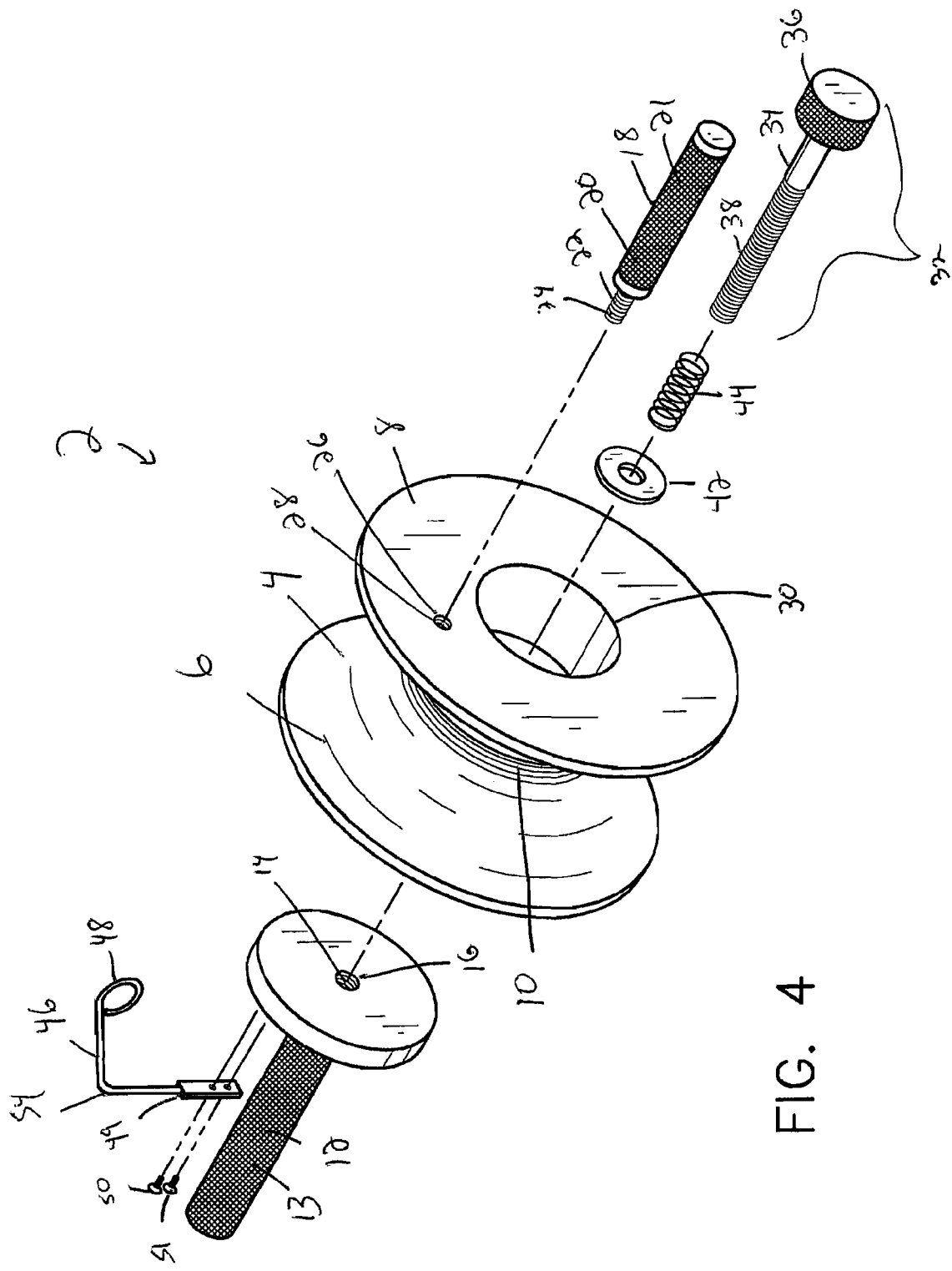
FIG. 4 shows a right perspective view of the fishing apparatus as it would in a disassembled manner, highlighting the various parts.
Figure 5:
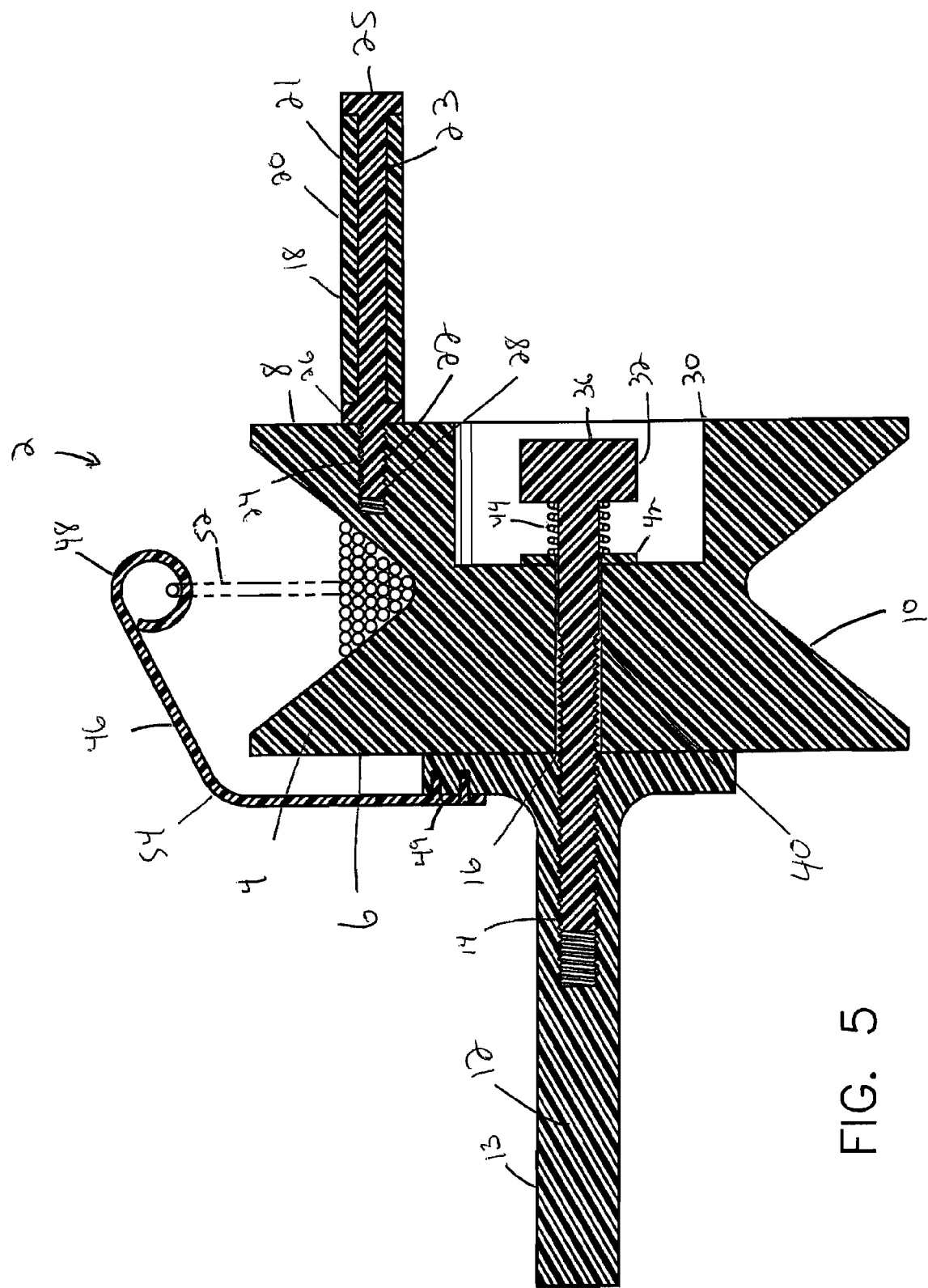
FIG. 5 shows a side cutaway view of the fishing apparatus as it would appear fully assembled.

With reference now to the drawings, and in particular to FIGS. 1 through 5 thereof, a new fishing apparatus embodying the principles and concepts of the present invention and generally designated by the reference numeral 2 will be described.

As best illustrated in FIGS. 1 through 5, the fishing apparatus 2 comprises a reel 4, with the reel 4 having two sides comprising a left side 6 and a right side 8. In between the left side 6 and the right side 8 of the reel 4, an indentation 10 is present. The indentation 10 is formed when the area in between the left side 6 and the right side 8 forms a "V shape," thereby allowing a length of line 52 to be wound around the area in between the left side 6 and the right side 8 of the reel 4. Line 52 can be a wide variety of lines, such as standard fishing line, a monofilament type of fishing line, or something similar.

Fishing apparatus 2 further comprises a plastic grip 12 that has two ends comprising a first end and a second end. The plastic grip 12 has a plurality of knurls 13 on it for easy grasping. The first end of the plastic grip 12 has a hole 16 in it, with the hole 16 having a plurality of internal threads 14 inside of it. The first end of the plastic grip 12 is the end of the plastic grip 12 that is placed against the left side 6 of the reel 4.

The right side 8 of the reel 4 has a central depression 30 located on it, with the depression 30 being circular in shape. The depth of the depression 30 is about halfway the diameter of the reel 4 overall. A hole 40 is centrally located within the depression, with this hole 40 traveling all the way through to the left side 6 of the reel 4.

In order to secure the plastic grip 12 to the left side 6 of the reel 4, a tensioner bolt 32 is used. Tensioner bolt 32 comprises a rod 34 that has two ends comprising a first end and a second end, with the second end of the tensioner bolt 32 being connected to a cap 36. The first end of the rod 34 of the tensioner bolt 32 has a plurality of external threads 38 that are capable of being threadably attached to the internal threads 14 within the hole 16 that is on the plastic grip 12.

Prior to the tensioner bolt 32 being inserted through the hole 40, a spring 44 and a washer 42 are placed on the tensioner bolt 32. Then, the first end of the tensioner bolt 32 is inserted through the hole 40 and onward through the hole 16 until the external threads 38 on the tensioner bolt 32 can be threadably attached to the internal threads 14 located within the hole 16 on the plastic grip 12. Once this occurs, the positioning of the tensioner bolt 32 in relation to the reel 4 can be adjusted, depending on how much tension in between the tensioner bolt 32 and the reel 4 is desired.

The fishing apparatus 2 further comprises a handle 18 that is attached to the right side 8 of the reel 4. Because of the presence of the depression 30, the handle 18 is attached in an offset manner—is not centrally located. The handle 18 further comprises a central shaft 23, with the central shaft 23 comprising a rod 22 and a cap 25. The rod 22 has two ends comprising a first end and a second end, with the first end of the rod 22 having a plurality of external threads 24 and the second end of the rod 22 having the cap 25 attached. The rod 22 itself is mounted within hole 26, which has a plurality of internal threads 28. The external threads 24 on the first end of the rod 22 are capable of being threadably attached to the plurality of internal threads 28 located within the hole 26. The central shaft 23 is fixedly attached to the right side 8 of the reel 4 and does not rotate at all.

A cylindrical sleeve 21 is located over the rod 22 portion of the central shaft 23. The cylindrical sleeve 21 has a length that goes from the right side 8 of the reel 4 to the cap 25 of the central shaft 23. The cylindrical sleeve 21 freely rotates around the rod 22 of the central shaft 23 and allows an individual to easily rotate the reel 4 when the fishing apparatus 2 is in use.

To help control the length of line 52 that is located around the indentation 10 and utilized by an individual while fishing, a line guide 46 is present. Line guide 46 comprises a bent rod 54 that has two ends comprising a first end and a second end. The first end of the bent rod 54 has a mount 49 that is attached to the left side 6 of the reel 4 through use of two guide mounting screws 50 and 51. The second end of the bent rod 54 has a loop 48 that is located directly over the length of line 52 that is located within the indentation and wound around the reel 4. An end of the length of line 52 would be placed through the loop 48, with the end of this line being attached to an actual fishing hook 60. This end of the line 52 is the end of the line 52 that would be cast out in a body of water for the purposes of fishing and attempting to catch a fish.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A fishing apparatus comprising:
a reel, the reel having two sides comprising a left side and a right side,
means for grasping the reel,
means for rotating the reel,
a length of fishing line wound around the reel,
wherein the reel further comprises an indentation, the indentation being present in between the left side and the right side of the reel,
wherein the indentation has a V-shape,
wherein the means for grasping the reel further comprises a grip, the grip having two ends comprising a first end and a second end,
wherein the first end of the grip is attached to the left side of the reel, means for fixedly attaching the grip to the left side of the reel,
wherein the means for fixedly attaching the grip to the left side of the reel further comprises a depression, the depression located in the right side of the reel, a hole centrally located in the depression, a hole located in the first end of the grip, a tensioner bolt, the tensioner bolt comprising a rod that has two ends comprising a first end and a second end, the tensioner bolt further comprising a cap, the cap being attached to the second end of the tensioner bolt, means for threadably attaching the first end of the tensioner bolt to the hole located in the first end of the grip, and means for providing tension for the tension bolt, wherein the means for threadably attaching the first end of the tensioner bolt to the hole located in the first end of the grip further comprises a plurality of internal threads located within the hole located in the first end of the grip, a plurality of external threads located on the first end of the rod of the tensioner bolt, wherein the first end of the tensioner bolt is inserted through the hole centrally located in the depression, further wherein the first end of the tensioner bolt is inserted through the hole located in the first end of the grip, and further wherein the internal threads located within the hole located in the first end of the grip are threadably attached to the plurality of external threads located on the first end of the rod of the tensioner bolt, wherein the means for providing tension on the tensioner bolt further comprises a washer, a spring, wherein the first end of the tensioner bolt is first placed through the spring, further wherein the first end of the tensioner bolt is next placed through the washer, and further wherein the first end of the tensioner bolt is next placed through the hole centrally located in the depression.

2. A fishing apparatus according to claim 1 wherein the means for rotating the reel further comprises (a) a handle, (b) wherein the handle is attached to the right side of the reel.

3. A fishing apparatus according to claim 2 wherein the handle is attached to the right side of the reel in an off-set manner.

4. A fishing apparatus according to claim 3 wherein the handle further comprises (a) a central shaft, the central shaft further comprising a rod that has two ends comprising a first end and a second end, (b) means for attaching the first end of the rod to the reel, (c) a cap attached to the second end of the rod, and (d) a cylindrical sleeve located over the rod portion of the central shaft, wherein the cylindrical sleeve freely rotates around the rod.

5. A fishing apparatus according to claim 4 wherein the means for attaching the first end of the rod to the reel further comprises (a) a hole located on the right side of the reel, (b) a plurality of internal threads located within the hole located on the right side of the reel, (c) a plurality of external threads located on the first end of the rod, (d) wherein the first end of the rod is inserted into the hole located on the right side of the reel, and (e) further wherein the plurality of internal threads located within the hole on the right side of the reel are threadably attached to the plurality of external threads located on the first end of the rod.

6. A fishing apparatus according to claim 5 wherein the apparatus further comprises a line guide, the line guide further comprising (a) a bent rod that has two ends comprising a first end and a second end, (b) a mount attached to the first end of the bent rod, the mount being attached to the left side of the reel, (c) a loop attached to the second end of the bent rod, (d) wherein the fishing line, as it leaves the reel, is inserted through the loop.

7. A fishing apparatus comprising a reel, the reel having two sides comprising a left side and a right side, the reel further comprising an indentation, the indentation being present in between the left side and the right side of the reel, the indentation having a V-shape, means for grasping the reel, said means further comprising (i) a grip, the grip having two ends comprising a first end and a second end, wherein the first end of the grip is attached to the left side of the reel, and (ii) means for fixedly attaching the grip to the left side of the reel, wherein said means for fixedly attaching the grip to the left side of the reel further comprises (1) a depression, the depression located in the right side of the reel, (2) a hole centrally located in the depression, (3) a hole located in the first end of the grip, (4) a tensioner bolt, the tensioner bolt comprising a rod that has two ends comprising a first end and a second end, the tensioner bolt further comprising a cap, the cap being attached to the second end of the tensioner bolt, (5) means for threadably attaching the first end of the tensioner bolt to the hole located in the first end of the grip, and (6) means for providing tension for the tension bolt, means for rotating the reel, said means for rotating the wheel further comprising (i) a handle, wherein the handle further comprises (1) a central shaft, the central shaft further comprising a rod that has two ends comprising a first end and a second end, (2) means for attaching the first end of the rod to the reel, (3) a cap attached to the second end of the rod, and (4) a cylindrical sleeve located over the rod portion of the central shaft, wherein the cylindrical sleeve freely rotates around the rod, a length of fishing line wound around the reel, a line guide, the line guide further comprising (i) a bent rod that has two ends comprising a first end and a second end, (ii) a mount attached to the first end of the bent rod, the mount being attached to the left side of the reel, (iii) a loop attached to the second end of the bent rod, (iv) wherein the fishing line, as it leaves the reel, is inserted through the loop, wherein the means for threadably attaching the first end of the tensioner bolt to the hole located in the first end of the grip further comprises a plurality of internal threads located within the hole located in the first end of the grip, a plurality of external threads located on the first end of the rod of the tensioner bolt, wherein the first end of the tensioner bolt is inserted through the hole centrally located in the depression, further wherein the first end of the tensioner bolt is inserted through the hole located in the first end of the grip, and wherein the internal threads located within the hole located in the first end of the grip are threadably attached to the plurality of external threads located on the first end of the rod of the tensioner bolt, wherein the means for providing tension on the tensioner bolt further comprises
  (a) a washer,
  (b) a spring,
  (c) wherein the first end of the tensioner bolt is first placed through the spring,
  (d) further wherein the first end of the tensioner bolt is next placed through the washer, and
  (e) further wherein the first end of the tensioner bolt is next placed through the hole centrally located in the depression.

8. A fishing apparatus according to claim 7 wherein the means for attaching the first end of the rod to the reel further comprises
  (a) a hole located on the right side of the reel,
  (b) a plurality of internal threads located within the hole located on the right side of the reel,
  (c) a plurality of external threads located on the first end of the rod,
  (d) wherein the first end of the rod is inserted into the hole located on the right side of the reel, and
  (e) further wherein the plurality of internal threads located within the hole on the right side of the reel are threadably attached to the plurality of external threads located on the first end of the rod.

* * * * *